(No Model.)
O. S. FOSTER.
ATTACHMENT FOR BED BOTTOMS.
No. 391,138. Patented Oct. 16, 1888.
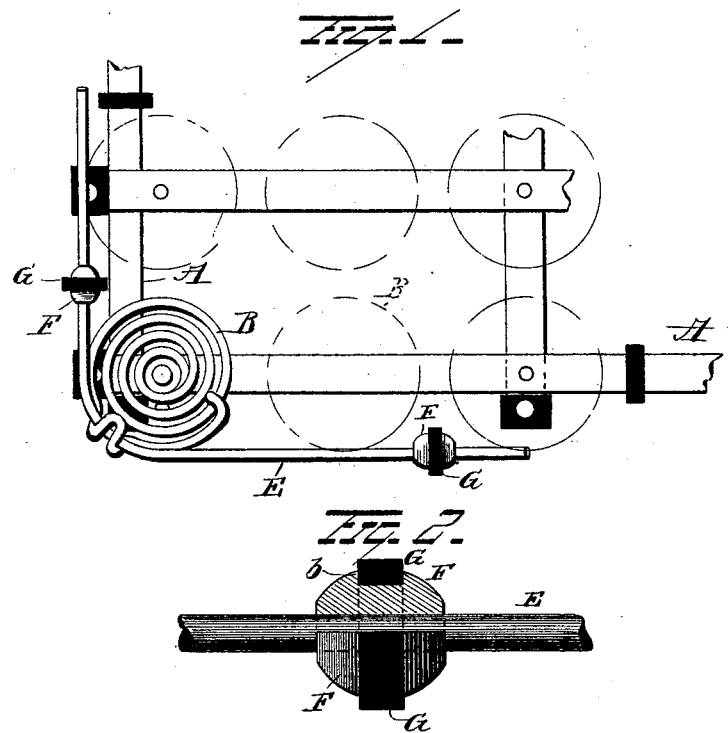
Witnesses,
E. J. Nottingham
G. F. Downing
Inventor,
Oscar S. Foster,
By his Attorneys
Leggett and Leggett.

UNITED STATES PATENT OFFICE.

OSCAR S. FOSTER, OF UTICA, NEW YORK.

ATTACHMENT FOR BED-BOTTOMS.

SPECIFICATION forming part of Letters Patent No. 391,138, dated October 16, 1888.

Application filed February 8, 1888. Serial No. 263,308. (No model.)

*To all whom it may concern:*

Be it known that I, OSCAR S. FOSTER, of Utica, in the county of Oneida and State of New York, have invented certain new and useful Improvements in Attachments for Bed-Bottoms; and I do hereby declare the following to be a full, clear, and exact description of the invention, such as will enable others skilled in the art to which it appertains to make and use the same.

My invention relates to an improved attachment for bed-bottoms.

The object of my present invention is to provide a bed-bottom with devices whereby it can be placed in position without liability of scratching or marring the bedstead.

A further object is to produce a cushioning device for bed-bottoms which shall effectually prevent noise and rattling of the same within the bedstead.

A further object is to produce a cushioning device for bed-bottoms which can be easily and quickly applied to the same and which shall be simple in construction and cheap to manufacture.

With these ends in view my invention consists in the peculiar construction and novel combination and arrangement of parts, as will be hereinafter set forth, and pointed out in the claims.

In the accompanying drawings, Figure 1 is a view of a portion of a bed-bottom having my improvements applied thereto; and Fig. 2 is a view in elevation, partly in section, of my buffer.

A indicates a portion of the frame of a bed-bottom made, preferably, of metal; B, helical springs secured thereto in any preferred manner, and E a border-rod for the support of the upper portions of the springs. Mounted on this border-rod are a series of buffers or cushions, each of which is composed of a spool, F, preferably of wood and having a central perforation to permit it to be placed upon and made to encircle the border-rod. Each spool F is provided on its periphery with a groove, *b*, extending completely around it for the reception of a band, G, of rubber or other elastic or yielding material. This band G may be cut from a rubber tube of a diameter preferably somewhat less than that of the spool, so that it can be forced over the periphery of said spool and into the groove *b*, where it will remain without any further fastening. The depth of the groove *b* should not be more than half the thickness of the rubber composing the band, so that the band will project beyond the spool and prevent the border-rod or spool from striking the bedstead. It will be seen that this spool may be made entirely of rubber, although I prefer to use a wooden spool provided with a peripheral rubber band, as that form of device is much cheaper to manufacture and serves the purpose for which it was intended equally as well.

By thus providing the frame of a bed-bottom and border-rods with elastic buffers or cushions not only prevents the bedstead from becoming marred and scratched in placing the bed-bottom to and removing it from position, but prevents the same from rattling by coming into contact with the bedstead after the bed-bottom is in position.

Having fully described my invention, what I claim as new, and desire to secure by Letters Patent, is—

1. The combination, with a bed-bottom having a border-rod, of a series of spools made to encircle the border-rail and provided with peripheral elastic bands, substantially as set forth.

2. The combination, with a bed-bottom having a border-rod, of a series of spools made to encircle said rod, and each provided with a peripheral groove, and an elastic band to fit in said groove and project a short distance beyond the periphery of the spool, substantially as set forth.

In testimonny whereof I have signed this specification in the presence of two subscribing witnesses.

OSCAR S. FOSTER.

Witnesses:
H. D. PITCHER,
W. E. SEAREY.